United States Patent
Yamamoto

(10) Patent No.: US 8,520,314 B2
(45) Date of Patent: Aug. 27, 2013

(54) ZOOM LENS

(75) Inventor: Akira Yamamoto, Yokohama (JP)

(73) Assignee: Canon Kabushiki Kaisha (JP)

( * ) Notice: Subject to any disclaimer, the term of this patent is extended or adjusted under 35 U.S.C. 154(b) by 114 days.

(21) Appl. No.: 13/180,159

(22) Filed: Jul. 11, 2011

(65) Prior Publication Data

US 2012/0013990 A1  Jan. 19, 2012

(30) Foreign Application Priority Data

Jul. 16, 2010  (JP) .................................. 2010-162043

(51) Int. Cl.
*G02B 15/14* (2006.01)
*G02B 1/06* (2006.01)
*G02B 3/12* (2006.01)

(52) U.S. Cl.
USPC ......................................... 359/676; 359/666

(58) Field of Classification Search
USPC .................................................. 359/665–667
See application file for complete search history.

(56) References Cited

U.S. PATENT DOCUMENTS

| 7,245,440 | B2 | 7/2007 | Peseux | |
|---|---|---|---|---|
| 7,317,580 | B2* | 1/2008 | Kogo et al. | 359/666 |
| 7,515,348 | B2 | 4/2009 | Hendriks et al. | |
| 7,679,833 | B2 | 3/2010 | Kuiper et al. | |
| 2006/0103947 | A1* | 5/2006 | Shinohara et al. | 359/687 |
| 2007/0097515 | A1* | 5/2007 | Jung et al. | 359/666 |
| 2009/0185281 | A1* | 7/2009 | Hendriks | 359/666 |
| 2010/0231783 | A1* | 9/2010 | Bueler et al. | 348/347 |
| 2010/0259833 | A1* | 10/2010 | Jannard et al. | 359/666 |

FOREIGN PATENT DOCUMENTS

| JP | 2006-178469 A | 7/2006 |
|---|---|---|
| JP | 2007-518130 A | 7/2007 |
| JP | 2008-541184 A | 11/2008 |

* cited by examiner

*Primary Examiner* — Darryl J Collins
(74) *Attorney, Agent, or Firm* — Rossi, Kimms & McDowell LLP

(57) ABSTRACT

The zoom lens of the present invention includes a variable focus lens and a stop. The variable focus lens is disposed on the light incident side of the stop, and where a distance from a first surface to an image plane of the zoom lens is defined as $T_a$, and a distance from a variable refractive power surface closest to the stop of the variable focus lens to the stop is defined as $T_b$, the condition of $T_b/T_a<0.22$ is satisfied.

5 Claims, 12 Drawing Sheets

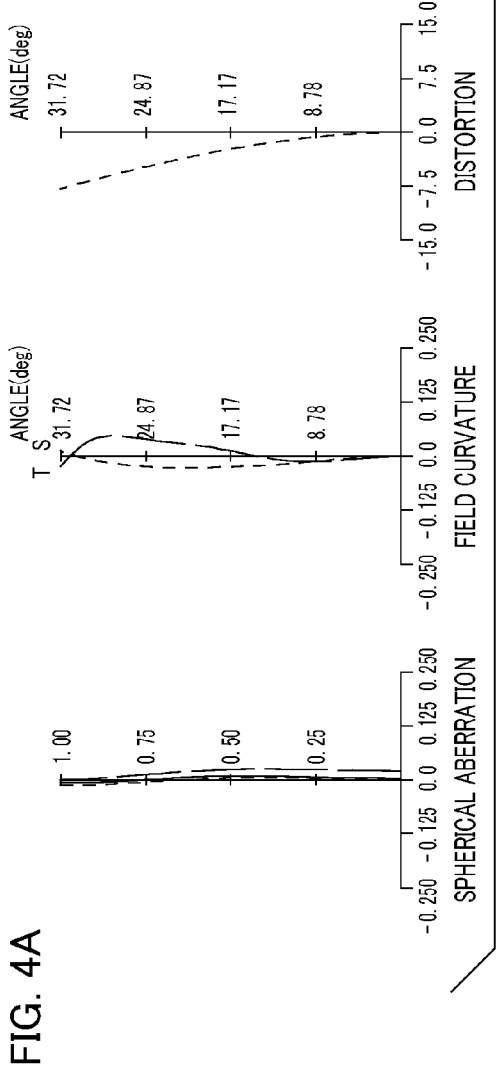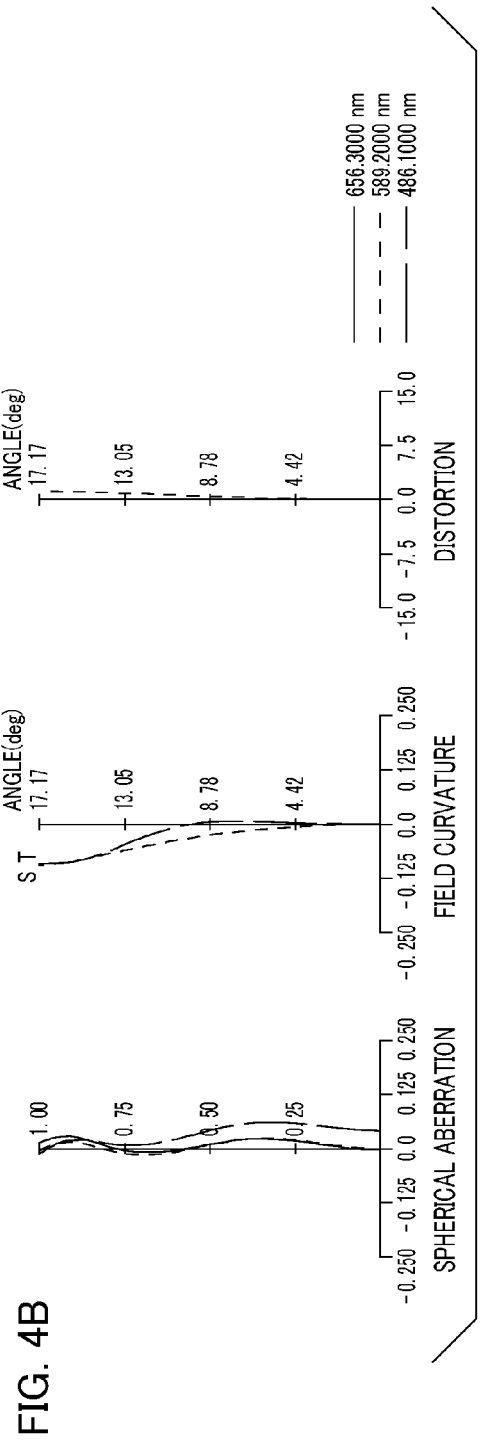

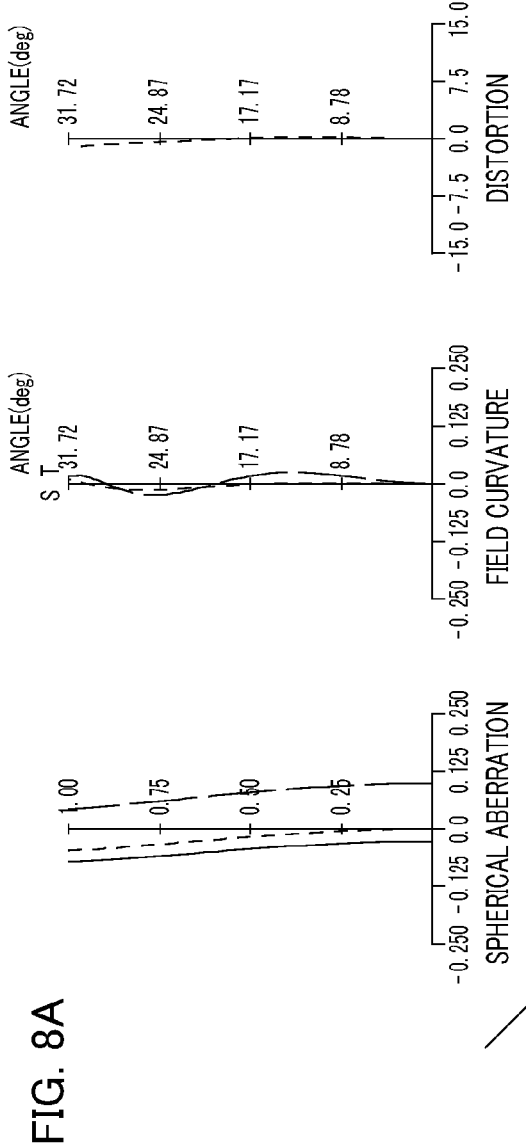
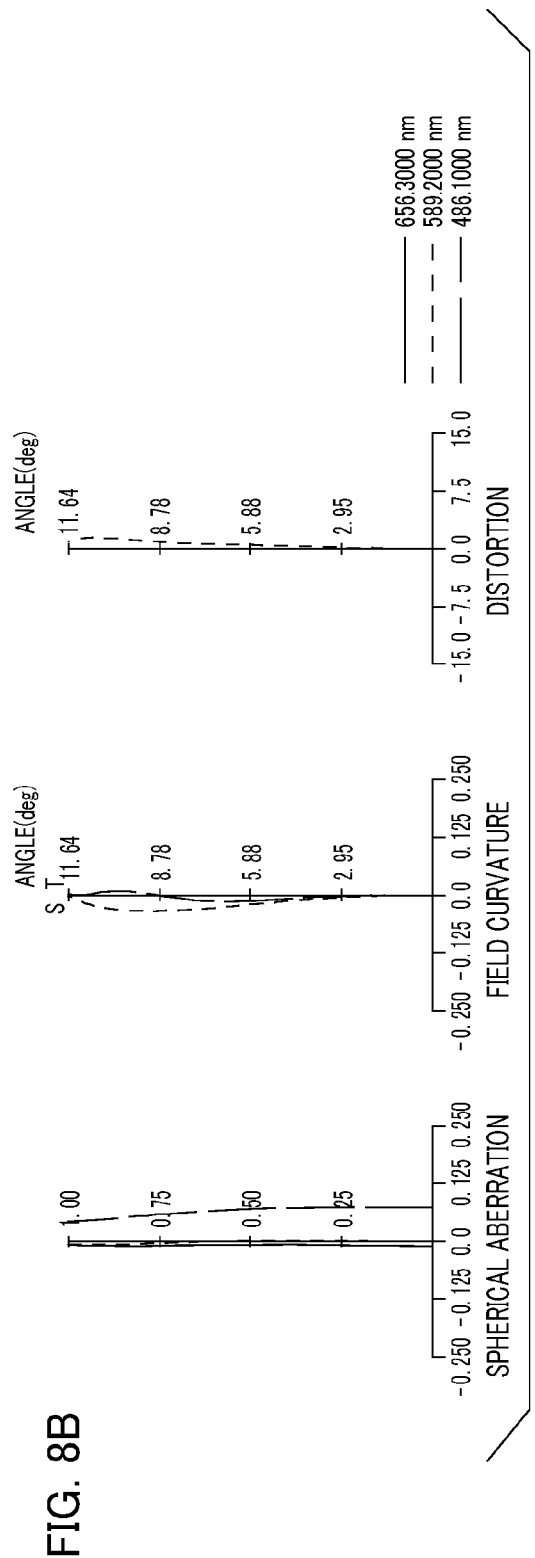
FIG. 8A
FIG. 8B

ZOOM LENS

BACKGROUND OF THE INVENTION

1. Field of the Invention

The present invention relates to a zoom lens including a variable focus lens.

2. Description of the Related Art

Conventionally, a variable focus lens (variable focus element) that is capable of changing a refractive power by controlling the shape of a liquid interface is known. The variable focus lens disclosed in Japanese Patent Laid-Open No. 2006-178469 can deform the contact surface (interface) formed between a conductive liquid and an insulation liquid having different refraction indices, respectively. The zoom lens disclosed in Japanese Patent Laid-Open No. 2008-541184 employs two variable focus lenses. The zoom lens disclosed in Japanese Patent Laid-Open No. 2007-518130 employs one variable focus lens and one switchable variable focus lens. The switchable variable focus lens changes the refractive power for the entire elements by providing a cavity on the exit side of a solid lens and exchanging gas and liquid within the cavity.

In the zoom lens disclosed in Japanese Patent Laid-Open No. 2008-541184 and Japanese Patent Laid-Open No. 2007-518130, a variable focus lens is disposed closest to the object (subject) side of the optical system. However, a variable focus lens is susceptible to the external influence by being disposed closest to the object side of the optical system. For example, when a variable focus lens is exposed to direct sunlight, the temperature difference between the shadowed portion and the exposed portion to sunlight occurs, resulting in the occurrence of convection in the liquid inside thereof. With this arrangement, the optical characteristics of the variable focus lens become unstable. This effect is considerably increased when the variable surface of the variable focus lens becomes larger.

SUMMARY OF THE INVENTION

Accordingly, the present invention provides a zoom lens in which the change in optical characteristics of the variable focus lens due to the external influences is small.

According to an aspect of the present invention, a zoom lens is provided that includes a variable focus lens and a stop, wherein the variable focus lens is disposed on the light incident side of the stop, and when a distance from a first surface to an image plane of the zoom lens is defined as $T_a$, and a distance from a variable refractive power surface closest to the stop of the variable focus lens to the stop is defined as $T_b$, the condition of $T_b/T_a < 0.22$ is satisfied.

According to the present invention, a zoom lens in which the change in optical characteristics of the variable focus lens due to the external influence is small may be provided.

Further features of the present invention will become apparent from the following description of exemplary embodiments with reference to the attached drawings.

BRIEF DESCRIPTION OF THE DRAWINGS

FIG. 4A is a longitudinal aberration diagram at the wide angle end, illustrating the effect of the zoom lens according to the first embodiment.

FIG. 4B is a longitudinal aberration diagram at the telephoto end, illustrating the effect of the zoom lens according to the first embodiment.

FIG. 8A is a longitudinal aberration diagram at the wide angle end, illustrating the effect of the zoom lens according to the second embodiment.

FIG. 8B is a longitudinal aberration diagram at the telephoto end, illustrating the effect of the zoom lens according to the second embodiment.

DESCRIPTION OF THE EMBODIMENTS

Hereinafter, preferred embodiments of the present invention will now be described with reference to the accompanying drawings.

First Embodiment

Figure 1A:
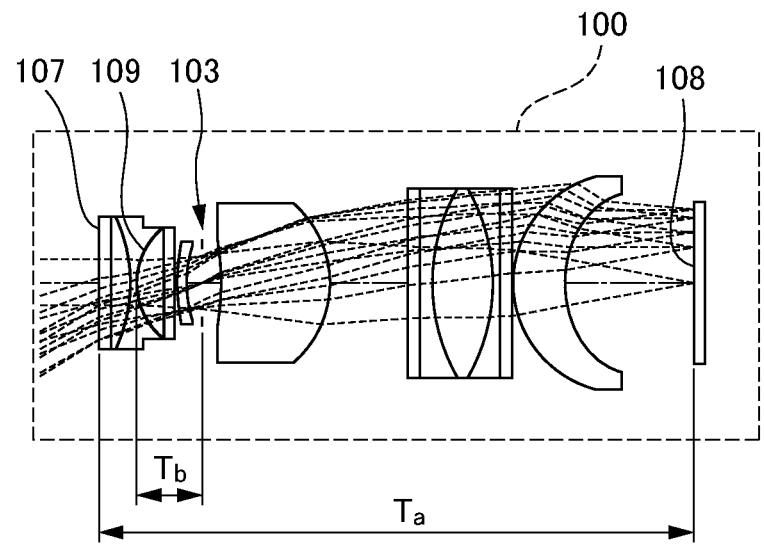
FIG. 1A is a lens cross-sectional view of a zoom lens at the wide angle end according to a first embodiment of the present invention.
Figure 1B:
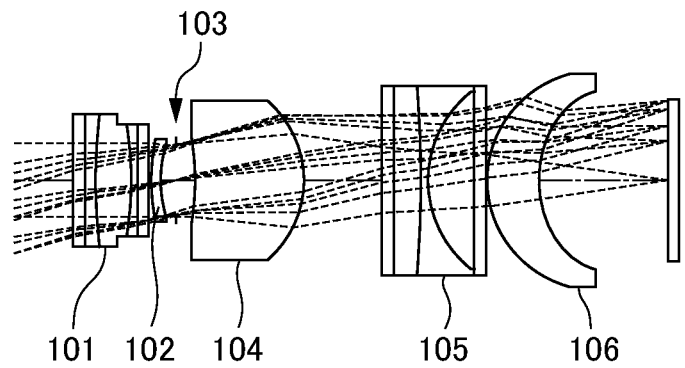
FIG. 1B is a lens cross-sectional view of a zoom lens at a telephoto end according to a first embodiment of the present invention.

Firstly, a zoom lens according to a first embodiment of the present invention will be described. FIG. 1A is a lens cross-sectional view of a zoom lens 100 at the wide angle end according to the present embodiment. FIG. 1B is a lens cross-sectional view of the zoom lens 100 at the telephoto end according to the present embodiment. The zoom lens 100 includes, in order from the object (subject) side, a first variable focus lens 101, a first fixed lens 102, a stop 103, a second fixed lens 104, a second variable focus lens 105, and a third fixed lens 106. Hereinafter, refractive power (optical power) is employed as a lens characteristic value corresponding to the inverse of a focal distance.

Figure 2:
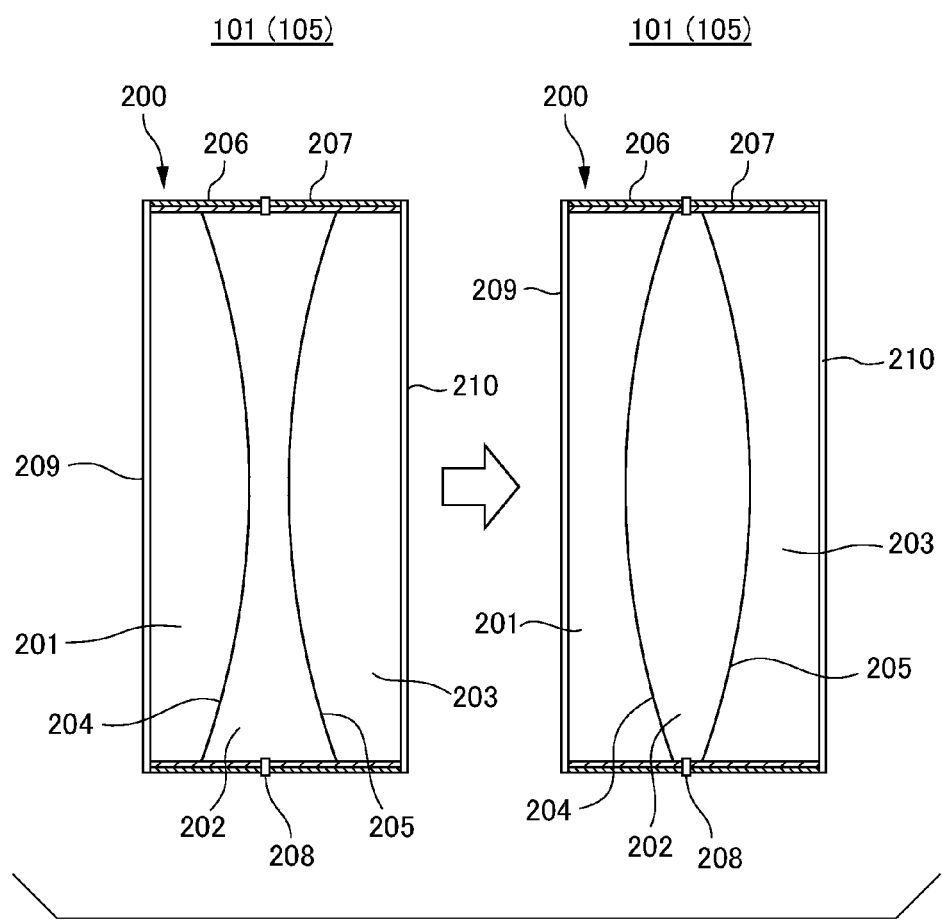
FIG. 2 is a schematic view illustrating the configuration of a variable focus lens according to the first embodiment.

FIG. 2 is a schematic cross-sectional view illustrating the configuration of first and second variable focus lenses 101 and 105. The variable focus lens 101 (105) employed by the zoom lens 100 of the present embodiment uses three types of liquid, and controls two interfaces formed by the three types of liquid using an electrowetting method. Hereinafter, a variable focus lens that can change refractive power by changing the shape of the liquid interface is referred to simply as a "liquid lens". The liquid lens 101 (105) has a generally cylindrical case 200. In the interior of the case 200, three types of liquid, a first liquid 201, a second liquid 202, and a third liquid 203, are arranged, in order from the light incident side, in three layers in the optical axis direction. As three types of liquid, materials that are immiscible to each other at two interfaces formed between the first liquid 201 and the second liquid 202 as well as the second liquid 202 and the third liquid 203 and have different refractive indices are employed. For example, water or an electrolysis solution is employed for the first liquid 201 and the third liquid 203, and oil or the like is employed for the second liquid 202. Hereinafter, an interface formed between the first liquid 201 and the second liquid 202 is referred to as a "first interface 204", and the other interface formed between the second liquid 202 and the third liquid 203 is referred to as a "second interface 205". Furthermore, the liquid lens 101 includes two electrodes 206, 207, an electrode separating unit 208, and cover glasses 209 and 210. The electrodes 206 and 207 are electrodes that control the first interface 204 and the second interface 205 independently based on external voltage supply. Each of the electrodes 206 and 207 has a conical cylinder shape in which a flat plate composed of two layers, i.e., a metal electrode layer and an insulating layer. As shown in FIG. 2, the electrodes 206 and 207 change the surface shape of interfaces by controlling the contact angle between the interfaces and the electrodes using the applied voltage, and thus change the total refractive power of the liquid lens 101. The electrode separating unit 208 is disposed at a position at which the electrode 206 and the electrode 207 are opposed to each other, and is configured by an insulation member that is capable of independently controlling the voltages of the electrodes 206 and 207. For the cover glasses 209 and 210, one is disposed on the light incident side of the liquid lens 101, and the other is disposed on the light emission side thereof. The cover glasses 209 and 210 are glass plates that seal the liquid 201 to 203 into the liquid lens 101.

In such a liquid lens, since convection occurs due to the temperature differences between the liquids, desired optical characteristics may not be obtained in a stable manner. An optical element that is disposed at the end of the object side or the image side of the zoom lens is more susceptible to the external influence. Also, the larger the outer shape of the liquid lens, the higher the temperature difference of liquid becomes, resulting in a reduction in optical performance. Therefore, in the zoom lens 100 of the present embodiment, the outer shape of the first liquid lens 101 that is disposed on the object side is made in small, and thus, the external influence is reduced.

Also, the zoom lens 100 of the embodiments of the present invention satisfies the following formula (1).

$$T_b/T_a<0.22 \tag{1}$$

Here, $T_a$ is the full length of the zoom lens 100 (the distance from a first surface 107 to an image plane 108 of the zoom lens), $T_b$ is the distance from a face 109, which is the closest to the stop 103 among the liquid interfaces (variable refractive power surfaces) of the first liquid lens 101, to the stop 103. In particular, in the present embodiment, the interface to which the distance $T_b$ is applied is the second interface 205. Since the position of the second interface slightly shifts due to zooming, the position of the second interface is set to the position at which the interface is the farthest from the stop 103.

Also, the liquid lenses 101 and 105 are respectively disposed in front of or behind the stop 103. Specifically, the first liquid lens 101 that is a first variable focus lens is disposed at the light incident side of the stop 103, whereas the second liquid lens 105 that is a second variable focus lens is disposed at the light emission side of the stop 103. With this arrangement, a reasonable refractive power is realized by the liquid lenses 101 and 105, resulting in a reduction in aberration.

Also, a first fixed lens (first lens) 102 is disposed between the first liquid lens 101 and the stop 103 as shown in FIG. 1A and FIG. 1B. For example, when the formula (1) is applied to the zoom lens 100, the variable surface 109 of the first liquid lens 101 becomes very small. At this time, in the first liquid lens 101, light beams are much overlapped at the wide angle end. In the normal zoom lens, the luminous fluxes of the field angles are split by the optical element closest to the object side, and thus, the occurrence of aberration is suppressed for each field angle. However, in the zoom lens 100 of the present embodiment, the first liquid lens 101 closest to the object side is made in small, and thus, such correction is difficult. Accordingly, in the present embodiment, the first fixed lens 102 is disposed between the first liquid lens 101 and the stop 103 to suppress the occurrence of aberration. A meniscus lens is employed for the first fixed lens 102, and is disposed with its concave surface facing the image side. With this arrangement, in particular, the occurrence of coma aberration can be reduced.

Also, the first fixed lens 102 of the present embodiment is disposed close to the stop 103. In general, the size of the optical element tends to increase as the optical element is separated from the stop 103. Thus, the optical element of the object side, which is closer to the outside world, is brought closer to the stop 103, whereby the size of the optical element can be reduced.

Also, a second fixed lens (second lens) 104, which has a positive refractive power and of which the refractive power on the surface of the image side is stronger than that on the surface of the object side, is disposed between the stop 103 and the second liquid lens 105. With this arrangement, the incident angle becomes small at the time when a light beam that passes through the wide angle end of the first liquid lens 101 is incident on the second liquid lens 105. Thus, the size of the second liquid lens 105 can be reduced as a consequence.

Furthermore, where the refractive power at the wide angle end of the first liquid lens 101 is $\phi L_{1W}$, the refractive power at the telephoto end is $\phi L_{1T}$, the refractive power at the wide angle end of the second liquid lens 105 is $\phi L_{2W}$, and the refractive power at the telephoto end is $\phi L_{2T}$, the following formulae (2), (3), and (4) are assumed to be satisfied.

$$\phi L_{1W}/\phi L_{1T}<0 \tag{2}$$

$$\phi L_{2W}/\phi L_{2T}<0 \tag{3}$$

$$\phi L_{1W}/\phi L_{2W}<0 \tag{4}$$

A control unit (not shown) constituting the zoom lens of the present embodiment controls the liquid lenses 101 and 105 such that the conditions of the formulae (2) and (3) are satisfied, that is to say, the signs of the refractive power of the liquid lenses 101 and 105 are interchanged. With this arrangement, the entire variable range of the refractive power of the liquid lenses 101 and 105 can be employed, whereby the zoom ratio can be set to be large. Likewise, the control unit controls the liquid lenses 101 and 105 such that the condition of the formula (4) is satisfied, that is to say, the refractive power of the liquid lenses 101 and 105 is reversed. With this arrangement, the fluctuations of the Petzval sum can be reduced, and thus, the variation of the field curvature can be reduced. In addition, the control unit controls the liquid lenses 101 and 105 such that they become the retrofocus type at the wide angle end ($\phi L_{1W}<0$, $\phi L_{2W}>0$), and become the telephoto type at the telephoto end ($\phi L_{1T}>0$, $\phi L_{2T}<0$). With this arrangement, the zoom ratio can be set to be large while the lenses are kept small and have a high optical performance. That is to say, when zooming is effected from the wide angle end to the telephoto end, the first liquid lens 101 may change from a negative refractive power to a positive refractive power, and the second liquid lens 105 may change from a positive refractive power to a negative refractive power.

Figure 3:
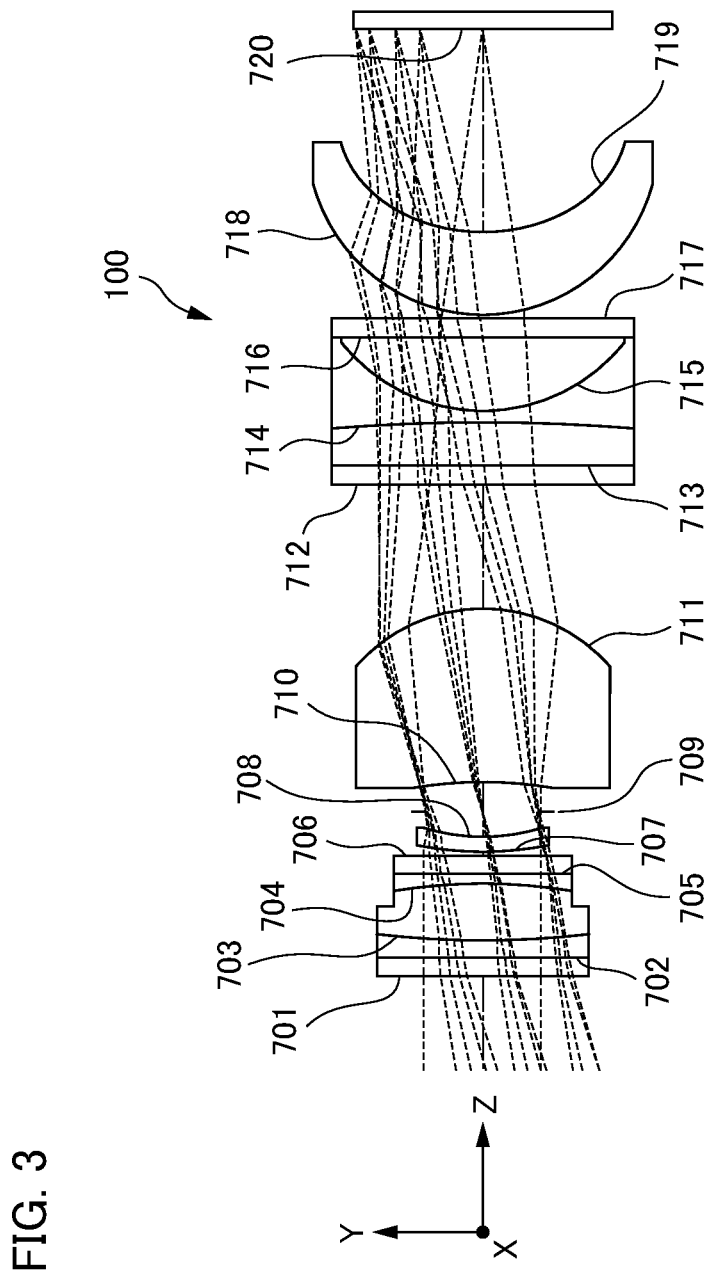
FIG. 3 is a diagram illustrating the surface numbers of the zoom lens according to the first embodiment.

Next, the effects of the present embodiment will be described by applying the aforementioned conditions to the zoom lens 100 and inserting specific numerical values for the conditions. Table 1 is a table that indicates various numerical values for the surface numbers 701 to 720 assigned to the components of the zoom lens 100 shown in FIG. 3. Here, in FIG. 3, the three-dimensional coordinate axes (Z-axis, Y-axis, and X-axis) are determined by setting the position of the light source (object) as the reference of the absolute coordinate system. The Z-axis is an axis that passes from the center of the zero surface to the center of the first surface (the origin of the absolute coordinate) and of which the direction is positive. Also, the Y-axis is an axis that passes through the center of the first surface and is rotated counterclockwise by 90 degrees to the Z-axis. The X-axis is an axis that passes through the origin and is perpendicular to the Z-axis and the Y-axis. In Table 1, the numerical values of a lens type (Type), a radius of curvature (R), a thickness between lens surfaces (D), a d-line refraction index ($N_d$), and an Abbe number ($v_d$) are described for each surface number (No.). Also, each of the first to third fixed lenses 102, 104, and 106 employs an optical element having a rotary-symmetric aspherical surface, and their surface shapes are represented by the following formula.

[Formula 1]

$$Z = \frac{cR^2}{1 + \sqrt{(1+k)c^2 R^2}} + AR^4 + BR^6 + CR^8 + DR^8 \quad (5)$$

Here, k is a conic coefficient, and c is a curvature (the inverse of radius of curvature R). The values of the coefficients k and A to D to be applied to the formula (5) are shown in Table 2. In Table 1, the lens type is described as "blank" when the surface shape is a spherical surface, whereas the lens type is described as "AL" when the surface shape is a rotary-symmetric aspherical surface. Likewise, for the surfaces corresponding to the liquid lenses 101 and 105, the variable value is described as "Variable", and the values corresponding to the zoom positions (Position 1 and Position 2) are shown in Table 3. Furthermore, "Object" indicates that an object is positioned at an infinite distance, and "INF" and "STO" respectively indicate infinity and a stop surface.

Here, as the condition of the present embodiment, a field angle has a whole field angle of 34.35 to 63.44 deg at a zoom magnification of 2, and F No. is 2.8 to 3.5. In particular, at the Position 1, f=5.78 and F No. is 2.8, whereas at the Position 2, f=11.55 and F No. is 3.5. In this case, the conditional formula is $T_b/T_a=0.105$ and the condition of the formula (1) is satisfied. As a reference, the longitudinal aberration diagrams (spherical aberration, field curvature, and distortion) according to the present embodiment are shown in FIG. 4A and FIG. 4B. In particular, FIG. 4A is a longitudinal aberration diagram at the wide angle end and FIG. 4B is a longitudinal aberration diagram at the telephoto end. In FIG. 4A and FIG. 4B, the vertical axis is the height of light beam that is incident on the zoom lens 100, and the horizontal axis is the position at which light beam intersects the optical axis. Light beams having the wavelength of the C-line (656.3 nm), the D-line (589.2 nm), and the F-line (486.1 nm) are described in FIG. 4A and FIG. 4B.

TABLE 1

| No. | Type | R | D | $N_d$ | $v_d$ |
|---|---|---|---|---|---|
| Object | | INF | INF | | |
| 701 | | INF | 0.5000 | 1.5163 | 64.1 |
| 702 | | INF | Variable | 1.8530 | 10.7 |
| 703 | | Variable | Variable | 1.6462 | 20.4 |
| 704 | | Variable | Variable | 1.3330 | 55.7 |
| 705 | | INF | 0.5000 | 1.5163 | 64.1 |
| 706 | | INF | 0.1000 | | |
| 707 | AL | 80.9925 | 0.4447 | 1.5214 | 54.8 |
| 708 | AL | 9.5413 | 0.7444 | | |
| 709 | STO | INF | 1.0846 | | |
| 710 | AL | −30.2197 | 4.9881 | 1.5948 | 61.7 |
| 711 | AL | −5.0792 | 3.5087 | | |
| 712 | | INF | 0.5000 | 1.5163 | 64.1 |
| 713 | | INF | Variable | 1.7894 | 10.5 |
| 714 | | Variable | Variable | 1.6400 | 21.2 |
| 715 | | Variable | Variable | 1.3330 | 55.7 |
| 716 | | INF | 0.5000 | 1.5163 | 64.1 |
| 717 | | INF | 0.1000 | | |
| 718 | AL | 4.9925 | 2.1685 | 1.7440 | 44.9 |
| 719 | AL | 6.3237 | 6.0135 | | |
| 720 | | INF | 0.0000 | | |

TABLE 2

| | k | A | B | C | D |
|---|---|---|---|---|---|
| 707 | 1314.43213 | 1.90943E−02 | 4.58725E−03 | 8.27217E−04 | −7.31576E−05 |
| 708 | 12.75258 | 2.23784E−02 | −5.63427E−03 | 1.21492E−03 | −1.33972E−04 |
| 710 | | −4.09521E−04 | −3.54371E−04 | | |
| 711 | | −3.62831E−04 | −4.00530E−05 | 1.58905E−06 | −1.10570E−07 |
| 718 | | 5.84298E−04 | −2.16425E−05 | 3.22627E−07 | 5.03569E−08 |
| 719 | | 2.45419E−03 | 2.35021E−05 | −4.52723E−06 | 7.71775E−07 |

TABLE 3

|       | Position1 | Position2 |
|-------|-----------|-----------|
| 702-D | 0.8860    | 0.5118    |
| 703-D | −6.7384   | 28.7455   |
| 703-R | 0.3000    | 0.8350    |
| 704-D | 3.1566    | −14.3132  |
| 704-R | 1.0591    | 0.8984    |
| 713-D | 0.5697    | 1.2699    |
| 714-D | 8.5737    | −47.4732  |
| 714-R | 2.7327    | 0.3000    |
| 715-D | −8.8067   | 5.0454    |
| 715-R | 0.3000    | 2.0325    |

As described above, the zoom lens of the present embodiment changes a focal distance by changing a refractive power using a miniaturized liquid lens, whereby the change in optical characteristics due to the external influence can be reduced even when a liquid lens is employed in the zoom lens. A cam, a motor, and the like, which move an optical element when zooming is performed, become unnecessary, and thus the number of parts can be reduced.

Second Embodiment

Figure 5A:
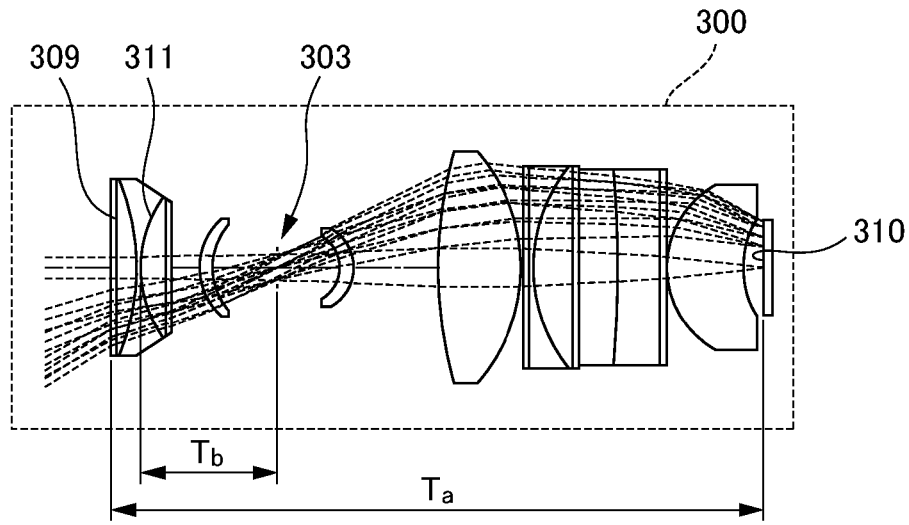
FIG. 5A is a lens cross-sectional view of a zoom lens at the wide angle end according to a second embodiment of the present invention.
Figure 5B:
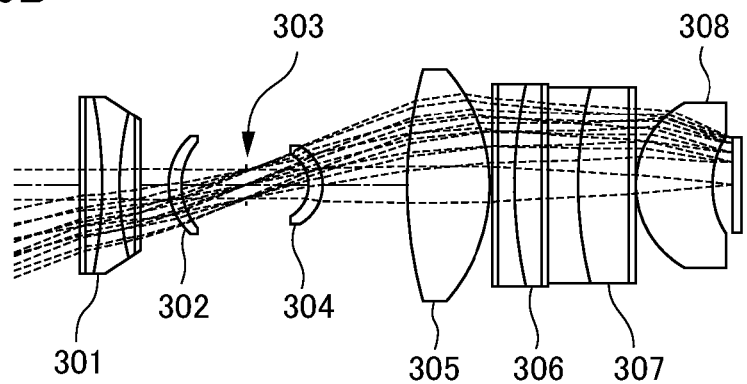
FIG. 5B is a lens cross-sectional view of a zoom lens at an intermediate zoom position according to a second embodiment of the present invention.
Figure 5C:
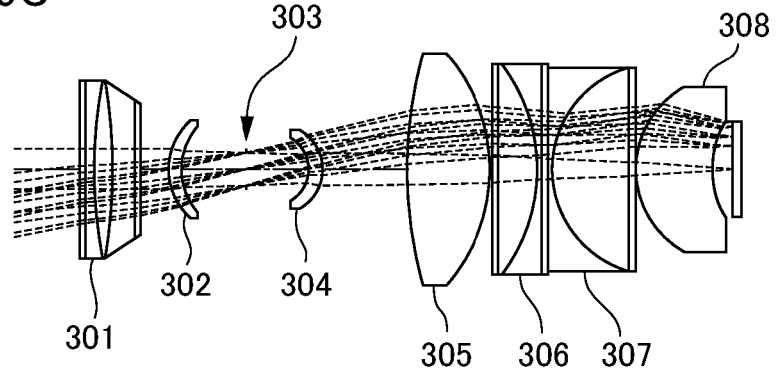
FIG. 5C is a lens cross-sectional view of a zoom lens at the telephoto end according to a second embodiment of the present invention.

Next, a zoom lens according to a second embodiment of the present invention will be described. In the zoom lens of the present embodiment, the configuration of the liquid lens in the zoom lens 100 according to the first embodiment is also changed and the arrangement of the optical elements is changed due to the structural changes in the liquid lens. FIG. 5A to FIG. 5C are schematic cross-sectional views illustrating the configuration of a zoom lens according to the present embodiment. A zoom lens 300 includes, in order from the object side, a first liquid lens 301, a first fixed lens 302, a stop 303, the second and third fixed lenses 304 and 305, the second and the third liquid lenses 306 and 307, a fourth fixed lens 308. In FIG. 5A to FIG. 5C, in particular, FIG. 5A is a lens cross-sectional view of the zoom lens 300 at the wide angle end, FIG. 5B is a lens cross-sectional view of the zoom lens 300 at the intermediate zoom position, and FIG. 5C is a lens cross-sectional view of the zoom lens 300 at the telephoto end. Here, the configuration of the first liquid lens 301 is substantially the same as that of the first liquid lens 101 according to the first embodiment, and explanation thereof will be omitted.

Figure 6:
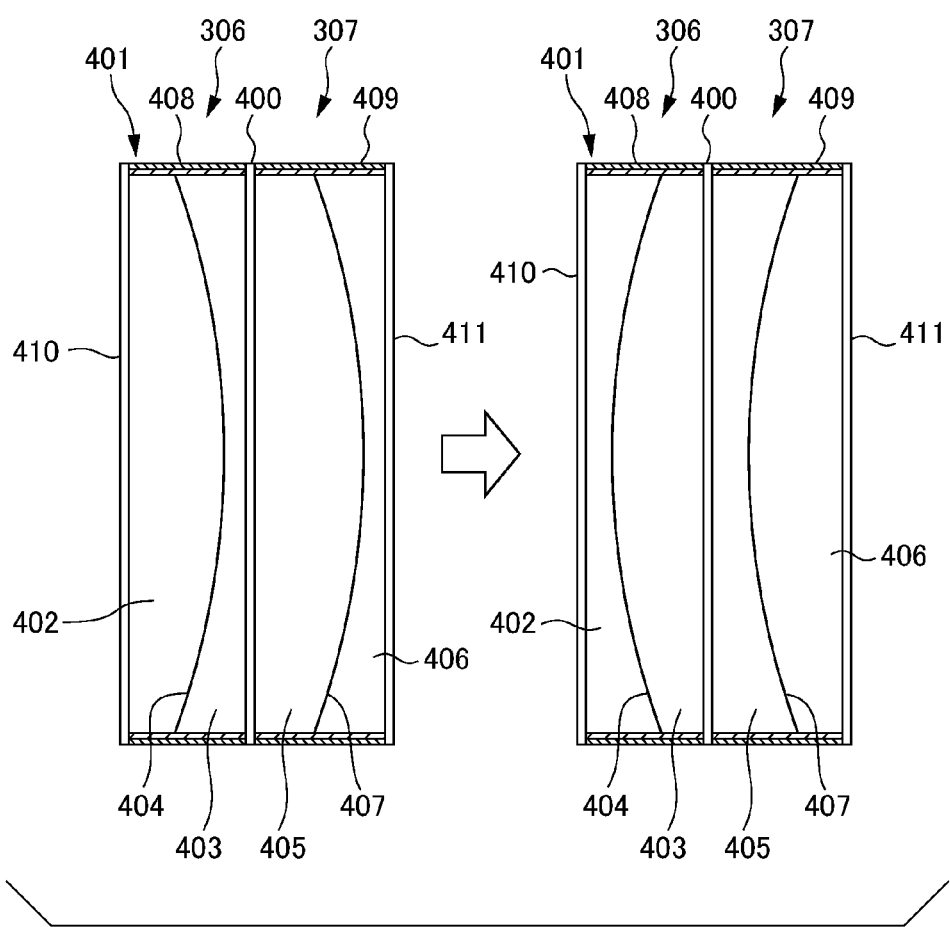
FIG. 6 is a schematic view illustrating the configuration of a variable focus lens according to the second embodiment.

FIG. 6 is a schematic cross-sectional view illustrating the configuration of second and third liquid lenses 306 and 307. The second and the third liquid lenses 306 and 307 employed in the zoom lens 300 of the present embodiment use two types of liquid, and control an interface formed by the two types of liquid using an electrowetting method. Also, as shown in FIG. 6, the second and the third liquid lenses 306 and 307 are constructed in an integral manner via a light-transmitting member 400 such as a glass plate or the like. Firstly, the second liquid lens 306 has a generally cylindrical case 401. In the interior of the case 401, two types of liquid, a first liquid 402 and a second liquid 403, are arranged in two layers in the optical axis direction. As two types of liquid, materials having different refractive indices, such as water, oil, or the like, are employed. Hereinafter, an interface formed between the first liquid 402 and the second liquid 403 is referred to as a "first interface 404". In the third liquid lens 307, liquid is arranged in a form similar to that in the second liquid lens 308. Another interface formed between first liquid 405 and second liquid 406 in the third liquid lens 307 is referred to as a "second interface 407". As in the liquid lens 101 of the first embodiment, the second and the third liquid lenses 306 and 307 respectively have electrodes 408 and 409. The electrodes 408 and 409 independently control the first interface 404 and the second interface 407 based on external voltage supply. In this case, the case 401 may be common to the second and the third liquid lenses 306 and 307, or may be unique for each lens with a different diameter as shown in FIG. 5. The configuration of the electrodes 408 and 409 and the configuration of cover glasses 410 and 411 are the same as those of the first liquid lens 101 according to the first embodiment. According to the second and the third liquid lenses 306 and 307, the same effect as that of the liquid lens 101 according to the first embodiment can be obtained by combining two liquid lenses. Furthermore, the second and the third liquid lenses 306 and 307 are combined via the light-transmitting member 400. Hence, the second liquid 403 of the second liquid lens 306 is not brought into direct contact with the first liquid 405 of the third liquid lens 307, whereby the degree of freedom in selecting liquid to be employed as a liquid lens increases.

Next, a description will be given of various conditions for the zoom lens 300 of the present embodiment. Firstly, as in the first embodiment, the first liquid lens 301 is disposed on the light incident side of the stop 303 and the object side of the zoom lens 300. With this arrangement, the magnification of the zoom lens 300 is increased by the optical elements that are disposed closer to the image side than the first liquid lens 301, and thus the fluctuation amount of the focal distance of the zoom lens 300 with respect to the refractive power change amount of the first liquid lens 301 can be increased.

As in the first embodiment, the components of the zoom lens 300 are installed so as to satisfy the formula (1). In this case, in the present embodiment, the distance $T_a$ in the formula (1) is the distance from a first surface 309 of the first liquid lens 301 to an image plane 310, whereas the distance $T_b$ is the distance from a second interface 311 of the first liquid lens 301 to the stop 303. With this arrangement, the first liquid lens 301 is disposed at a position closer to the stop 303, and thus, the miniaturization of the first liquid lens 301 can be realized.

Also, on the image side of the first liquid lens 301, the first and the second fixed lenses 302 and 304, which both employ a meniscus lens, are disposed so as to sandwich the stop 303. The first fixed lens 302 has a concave surface facing the image side of the lens, and the second fixed lens 304 has a concave surface facing the object side of the lens. With this arrangement, the aberration that could not be adequately corrected by using only the first liquid lens 301 closest to the object side can be corrected.

Furthermore, where the refractive power at the wide angle end of the first liquid lens 301 is $\phi L_{3W}$, the refractive power at the telephoto end is $\phi L_{3T}$, whereas the refractive power at the wide angle end of the liquid lens which combines the second and the third liquid lenses 306 and 307 is $\phi L_{4W}$, and the refractive power at the telephoto end is $\phi L_{4T}$, also in the present embodiment, the formulae (6), (7), and (8), which respectively correspond to the formulae (2), (3), and (4) of the first embodiment, are assumed to be satisfied.

$$\phi L_{3W}/\phi L_{3T}<0 \qquad (6)$$

$$\phi L_{4W}/\phi L_{4T}<0 \qquad (7)$$

$$\phi L_{3W}/\phi L_{4W}<0 \qquad (8)$$

With this arrangement, the fluctuations of the Petzval sum due to the refractive power variation at the wide angle side can be reduced, and thus, the zoom ratio can be set to be large. That is to say, when zooming is effected from the wide angle end to the telephoto end, the first liquid lens 301 may change from a negative refractive power to a positive refractive power, and the liquid lens which combines the second and the third liquid lenses 306 and 307 may change from a positive refractive power to a negative refractive power.

Figure 7:
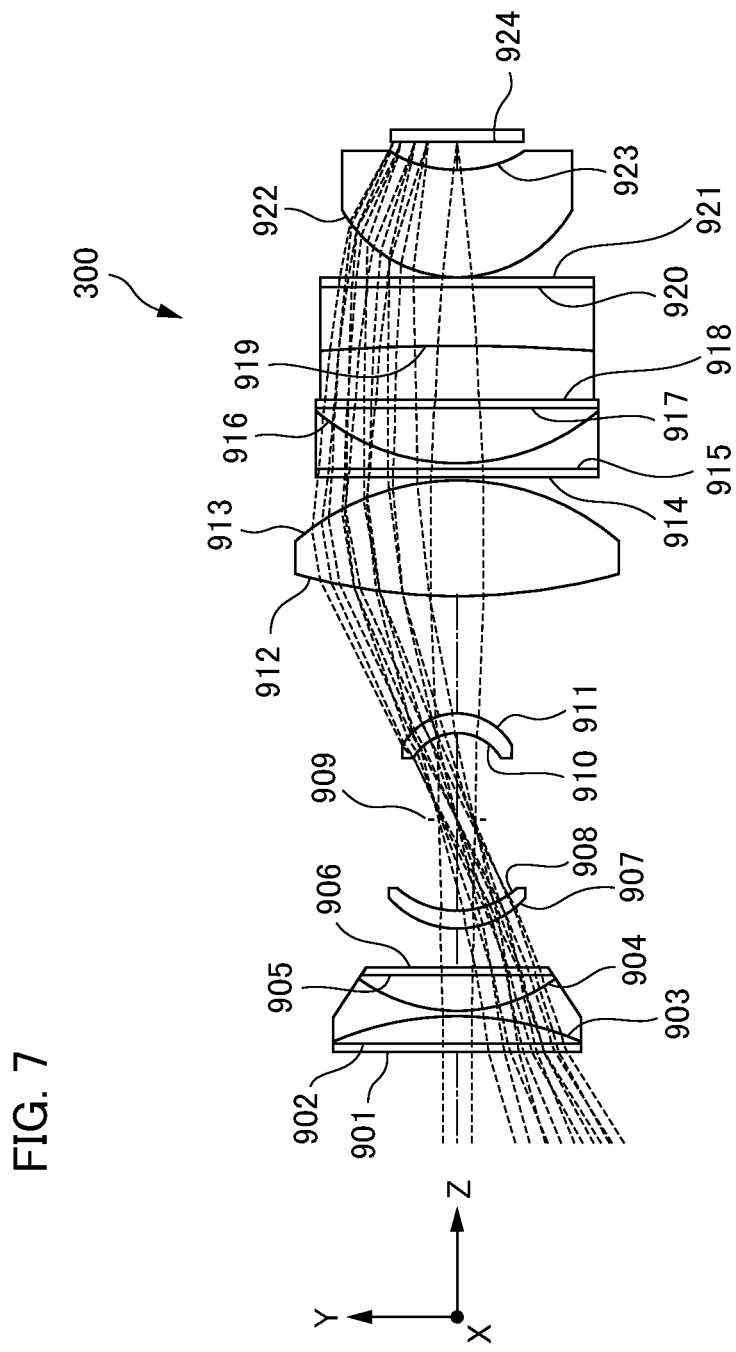
FIG. 7 is a diagram illustrating the surface numbers of the zoom lens according to the second embodiment.

Next, the effects of the present embodiment will be described by applying the aforementioned conditions to the zoom lens 300 and inserting specific numerical values for the conditions. Table 4 is a table that indicates various numerical values for the surface numbers 901 to 924 assigned to the components of the zoom lens 300 shown in FIG. 7. The values of the coefficients to be applied to the formula (5) are shown in Table 5. In Table 4, the values corresponding to the zoom positions (the Position 1, the Position 2, and the Position 3) are shown in Table 6. Tables 4 to 6 respectively correspond to Tables 1 to 3 according to the first embodiment. Here, as the conditions of the present embodiment, a field angle has a whole field angle of 23.29 to 63.44 deg in three times zoom, and F No. is 2.8 to 5.0. In particular, at the Position 1, f=5.78 and F No. is 2.8, whereas at the Position 2, f=9.08 and F No. is 3.5. Furthermore, at the Position 3, f=17.33 and F No. is 5.0. In this case, the conditional formula is $T_b/T_a=0.197$ and the condition of the formula (1) is satisfied. As a reference, the longitudinal aberration diagrams (spherical aberration, field curvature, and distortion) at the wide angle end and the telephoto end according to the present embodiment are shown in FIG. 8A and FIG. 8B. FIG. 8A and FIG. 8B respectively correspond to FIG. 4A and FIG. 4B according to the first embodiment. With this arrangement, according to the present embodiment, the same effect as that in the first embodiment can be achieved.

TABLE 4

| No. | Type | R | D | $N_d$ | $v_d$ |
|---|---|---|---|---|---|
| Object | | INF | INF | | |
| 901 | | INF | 0.5000 | 1.5163 | 64.1 |
| 902 | | INF | Variable | 1.9548 | 10.7 |
| 903 | | Variable | Variable | 1.7561 | 20.4 |
| 904 | | Variable | Variable | 1.3330 | 55.7 |
| 905 | | INF | 0.5000 | 1.5163 | 64.1 |
| 906 | | INF | 2.6403 | | |
| 907 | | 4.3714 | 0.3869 | 1.7552 | 54.8 |
| 908 | AL | 4.5130 | 4.7724 | | |
| 909 | STO | INF | 5.3157 | | |
| 910 | AL | −2.7936 | 1.0709 | 1.4913 | 61.7 |
| 911 | | −3.3781 | 6.0889 | | |
| 912 | AL | 29.7651 | 7.0000 | 1.6204 | 64.1 |
| 913 | | −10.6976 | 0.1000 | | |
| 914 | | INF | 0.5000 | 1.5163 | 64.1 |
| 915 | | INF | Variable | 1.5976 | 10.9 |
| 916 | | Variable | Variable | 1.6400 | 21.2 |
| 917 | | INF | 0.5000 | 1.5163 | 64.1 |
| 918 | | INF | Variable | 1.7092 | 15.3 |
| 919 | | Variable | Variable | 1.3330 | 55.7 |
| 920 | | INF | 0.5000 | 1.5163 | 64.1 |
| 921 | | INF | 0.4862 | | |
| 922 | | 8.7828 | 7.0000 | 1.62041 | 60.3 |
| 923 | AL | 10.2458 | 0.9735 | | |
| 924 | | INF | | | |

TABLE 5

| | k | A | B | C | D |
|---|---|---|---|---|---|
| 908 | | 9.61209E−05 | −1.65345E−05 | 1.37896E−06 | |
| 911 | | −1.26992E−04 | 1.52535E−05 | −8.36452E−01 | |
| 913 | | 1.77774E−04 | −6.92324E−08 | 9.75284E−09 | |
| 923 | | 1.22811E−03 | −1.52547E−04 | 1.22187E−05 | |

TABLE 6

| | Position1 | Position2 | Position3 |
|---|---|---|---|
| 902-D | 1.5127 | 1.2673 | 0.6402 |
| 903-D | 0.3000 | 1.3069 | 1.3891 |
| 903-R | −15.9699 | −25.9373 | 36.7744 |
| 904-D | 1.8776 | 1.1161 | 1.6611 |
| 904-R | 8.3396 | 18.3373 | −39.1185 |
| 915-D | 0.3000 | 1.2919 | 3.0033 |
| 916-D | 3.0033 | 2.0114 | 0.3000 |
| 916-R | 12.1496 | 38.0723 | −13.0587 |
| 918-D | 2.9842 | 2.3447 | 0.3000 |
| 919-D | −108.1129 | 32.2736 | 8.0803 |
| 919-R | 3.2695 | 3.9090 | 5.9537 |

Third Embodiment

Figure 9A:
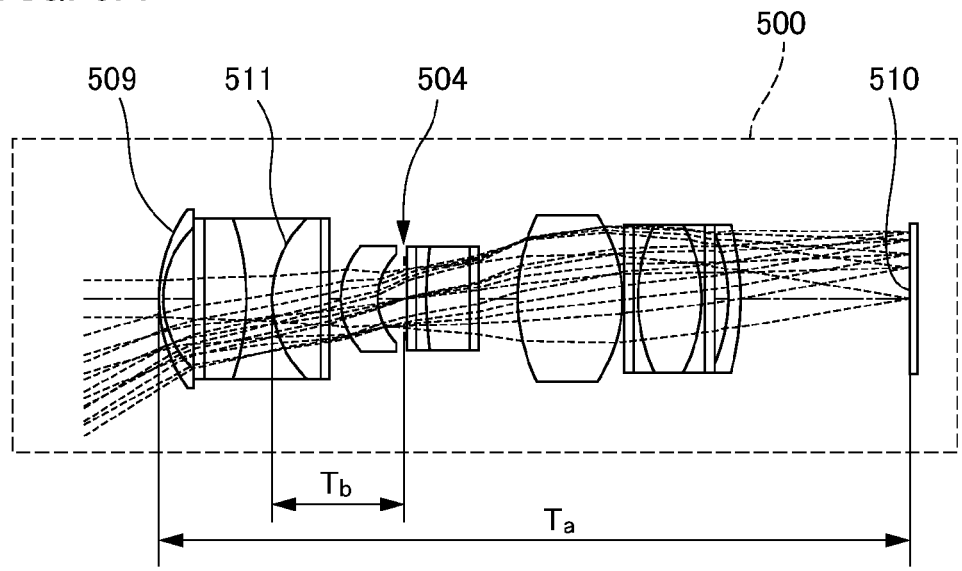
FIG. 9A is a lens cross-sectional view of a zoom lens at the wide angle end according to a third embodiment of the present invention.
Figure 9B:
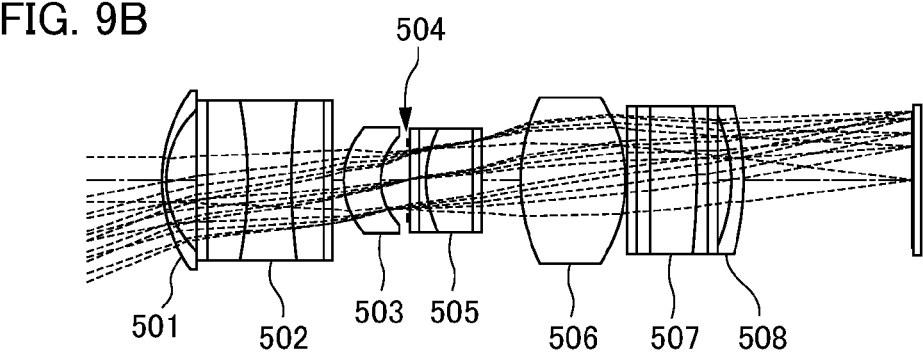
FIG. 9B is a lens cross-sectional view of a zoom lens at an intermediate zoom position according to a third embodiment of the present invention.
Figure 9C:
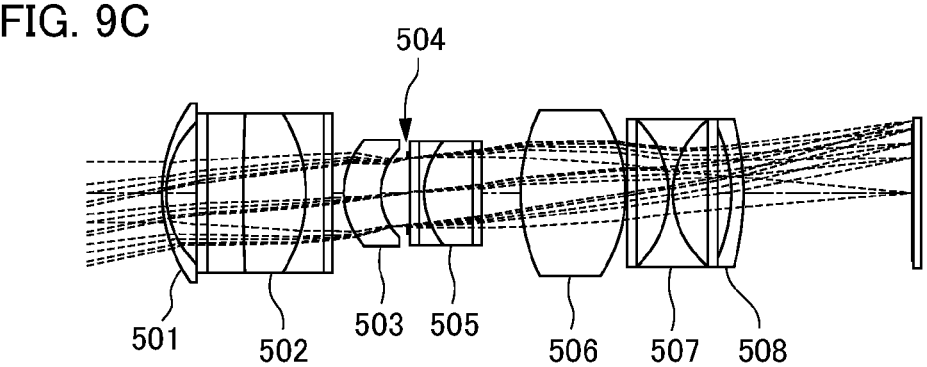
FIG. 9C is a lens cross-sectional view of a zoom lens at the telephoto end according to a third embodiment of the present invention.

Next, a zoom lens according to a third embodiment of the present invention will be described. In the zoom lens of the present embodiment is different from the zoom lens 100 according to the first embodiment in that three liquid lenses are installed, whereby the arrangement of the optical elements is changed along with an increase in the number of liquid lenses installed. FIG. 9A to FIG. 9C are schematic cross-sectional views illustrating the configuration of a zoom lens according to the present embodiment. A zoom lens 500 includes, in order from the object side, a first fixed lens 501, a first liquid lens 502, a second fixed lens 503, a stop 504, a second liquid lens 505, a third fixed lens 506, a third liquid lens 507, and a fourth fixed lens 508. In FIG. 9A to FIG. 9C, in particular, FIG. 9A is a lens cross-sectional view of the zoom lens 500 at the wide angle end, FIG. 9B is a lens cross-sectional view of the zoom lens 500 at the intermediate zoom position, and FIG. 9C is a lens cross-sectional view of the zoom lens 500 at the telephoto end. Here, the configuration of the first to third liquid lenses 502, 505, and 507 is substantially the same as that of the first liquid lens 101 according to the first embodiment, and explanation thereof will be omitted.

Next, a description will be given of various conditions for the zoom lens 500 of the present embodiment. Firstly, the present embodiment is different from the first embodiment in that the first liquid lens 502 is not disposed closest to the object side of the zoom lens 500, but is disposed at the rear of the first fixed lens 501, which is a concave lens. With this arrangement, the external influence on the first liquid lens 502 can be reduced, and the zoon magnification can be increased. As in the first embodiment, it is desired that the components in the zoom lens 500 be installed so as to satisfy the formula (1). In the present embodiment, the distance $T_a$ in the formula (1) is the distance from a first surface 509 of the first fixed lens 501 to an image plane 510, whereas the distance $T_b$ is the distance from a second interface 511 of the first liquid lens 502 to the stop 504.

Also, the first liquid lens 502 and the third liquid lens 507 respectively correspond to the first liquid lens 101 and the second liquid lens 105 according to the first embodiment, both of which have the same function. In contrast, in the present embodiment, the second liquid lens 505 is newly disposed between the second fixed lens 503 and the third fixed lens 506. The stop 504 is disposed just before the second liquid lens 505 (on the object side). The second liquid lens 505 has a positive refractive power in the entire zoom range. With this arrangement, the height of luminous flux incident on the third liquid lens 507 can be reduced, resulting in reduction in size of the third liquid lens 507. Also, since the positive refractive power is enhanced from the wide angle end to the telephoto end, the fluctuations in the Petzval sum beyond correction only by the first and the second liquid lenses 502 and 507 can be further suppressed.

Figure 10:
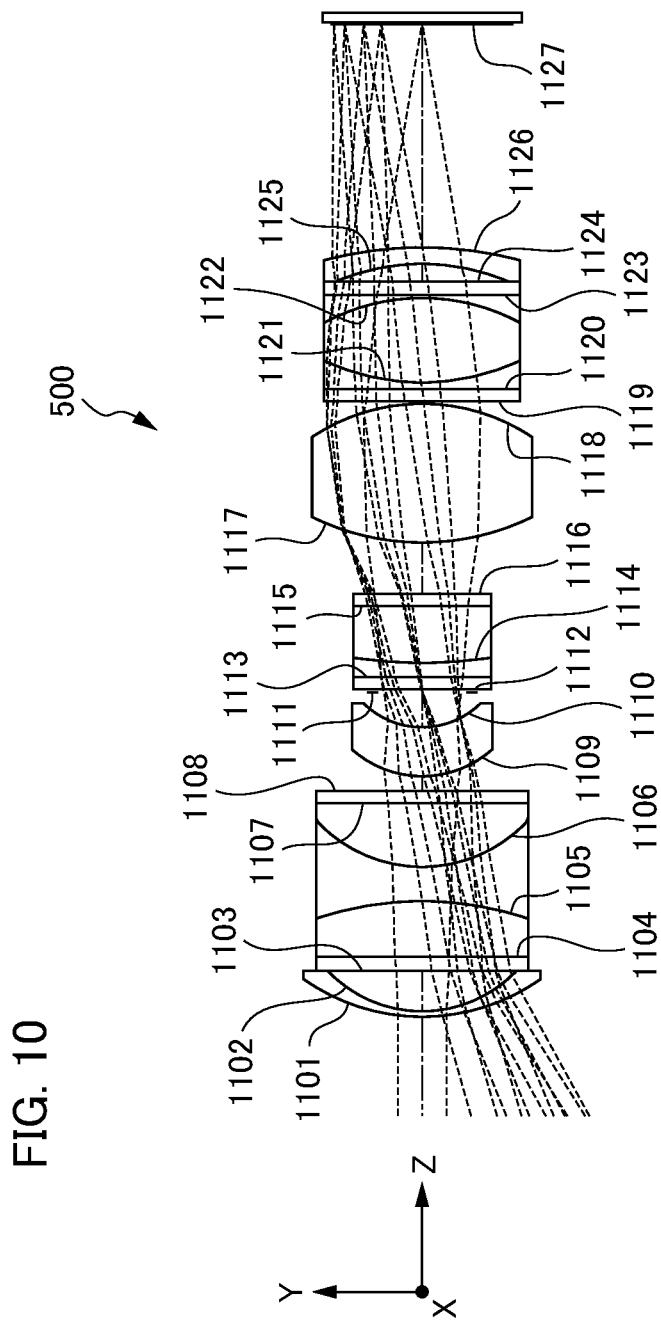
FIG. 10 is a diagram illustrating the surface numbers of the zoom lens according to the third embodiment.
Figure 11A:
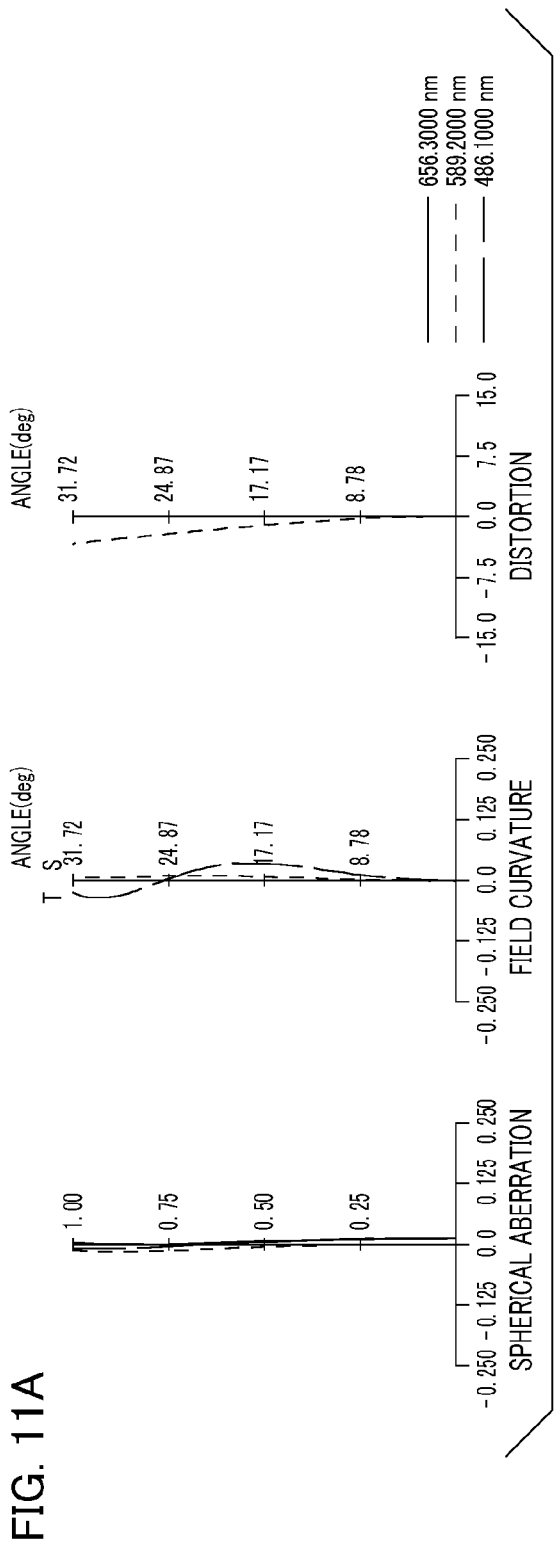
FIG. 11A is a longitudinal aberration diagram at the wide angle end, illustrating the effect of the zoom lens according to the third embodiment.
Figure 11B:
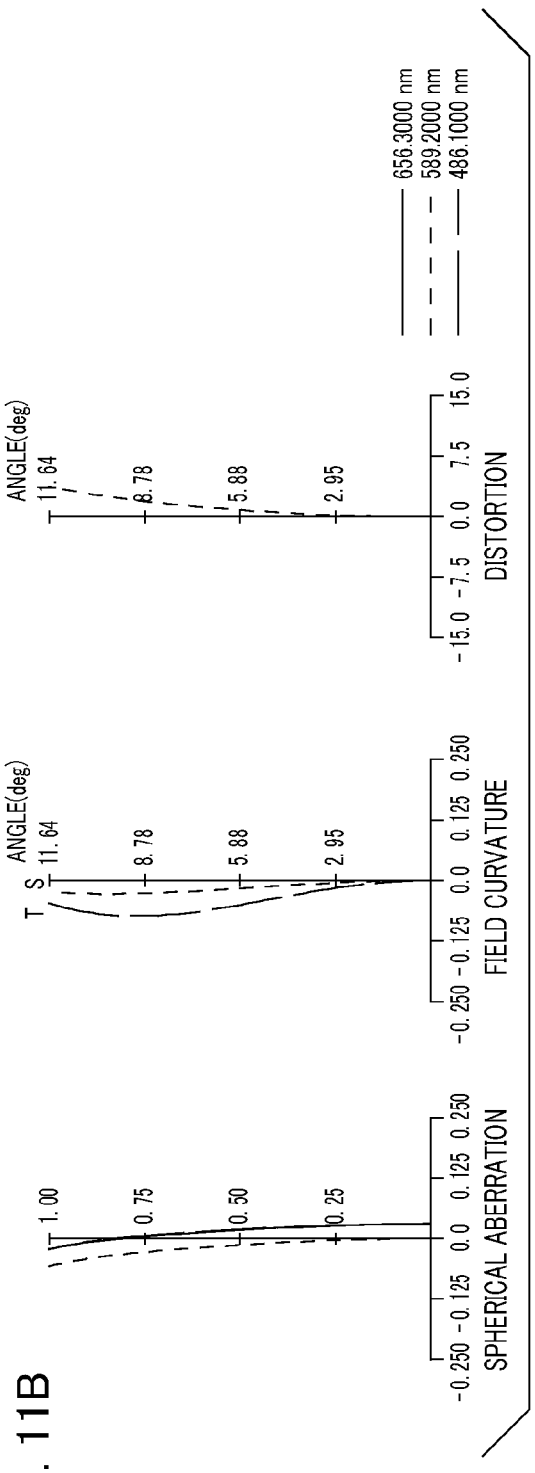
FIG. 11B is a longitudinal aberration diagram at the telephoto end, illustrating the effect of the zoom lens according to the third embodiment.

Next, the effects of the present embodiment will be described by applying the aforementioned conditions to the zoom lens 500 and inserting specific numerical values for the conditions. Table 7 is a table that indicates various numerical values for the surface numbers 1101 to 1127 assigned to the components of the zoom lens 500 shown in FIG. 10. The values of the coefficients to be applied to the formula (5) are shown in Table 8. In Table 7, the values corresponding to the zoom positions (the Position 1, the Position 2, and the Position 3) are shown in Table 9. Table 7 to Table 9 respectively corresponds to Table 1 to Table 3 according to the first embodiment. Here, as the condition of the present embodiment, a field angle has a whole field angle of 23.29 to 63.44 deg in three times zoom, and F No. is 3.0 to 5.6. In particular, at the Position 1, f=5.78 and F No. is 3.0, whereas at the Position 2, f=9.08 and F No. is 4.0. Furthermore, at the Position 3, f=17.33 and F No. is 5.6. As a reference, the longitudinal aberration diagrams (spherical aberration, field curvature, and distortion) at the wide angle end and the telephoto end according to the present embodiment are shown in FIG. 11A and FIG. 11B. FIG. 11A and FIG. 11B respectively correspond to FIG. 4A and FIG. 4B according to the first embodiment as well as FIG. 8A and FIG. 8B according to the second embodiment. With this arrangement, according to the present embodiment, the same effects as those in the first embodiment can be achieved.

TABLE 7

| No. | Type | R | D | $N_d$ | $v_d$ |
|---|---|---|---|---|---|
| Object | | INF | INF | | |
| 1101 | | 8.0261 | 0.2200 | 1.7439 | 44.9 |
| 1102 | AL | 4.8756 | 1.6375 | | |
| 1103 | | INF | 0.5000 | 1.5163 | 64.1 |
| 1104 | | INF | Variable | 1.6812 | 11.3 |
| 1105 | | Variable | Variable | 1.6400 | 21.2 |
| 1106 | | Variable | Variable | 1.3996 | 21.8 |
| 1107 | | INF | 0.5000 | 1.5163 | 64.1 |
| 1108 | | INF | 0.5769 | | |
| 1109 | | 4.0949 | 1.9154 | 1.5523 | 46.5 |
| 1110 | | 3.1926 | 1.4427 | | |
| 1111 | STO | INF | 0.1000 | | |
| 1112 | | INF | 0.5000 | 1.5163 | 64.1 |
| 1113 | | INF | Variable | 1.5432 | 12.1 |
| 1114 | | Variable | Variable | 1.6830 | 17.0 |
| 1115 | | INF | 0.5000 | 1.5163 | 64.1 |
| 1116 | | INF | 2.0000 | | |
| 1117 | | 9.8732 | 5.5000 | 1.4875 | 70.4 |
| 1118 | AL | -6.7998 | 0.1003 | | |
| 1119 | | INF | 0.5000 | 1.5163 | 64.1 |
| 1120 | | INF | Variable | 1.4924 | 13.9 |
| 1121 | | Variable | Variable | 1.6400 | 21.2 |
| 1122 | | Variable | Variable | 1.4283 | 18.2 |
| 1123 | | INF | 0.5000 | 1.5163 | 64.1 |
| 1124 | | INF | 0.7312 | | |
| 1125 | | -8.4632 | 0.6185 | 1.7552 | 27.6 |
| 1126 | AL | -13.2572 | 8.8426 | | |
| 1127 | | INF | 0.0000 | | |

TABLE 8

| k | A | B | C | D |
|---|---|---|---|---|
| 1102 | -2.36212E-04 | -1.29715E-06 | -1.13577E-06 | |
| 1118 | 5.40858E-04 | -2.22746E-06 | 4.72245E-07 | |
| 1126 | 1.32987E-04 | 1.22543E-05 | -3.74879E-08 | |

TABLE 9

| | Position1 | Position2 | Position3 |
|---|---|---|---|
| 1104-D | 2.2308 | 2.1114 | 1.9252 |
| 1105-D | 1.3473 | 2.2971 | 3.2556 |
| 1105-R | -12.8959 | -21.1902 | 717.6384 |
| 1106-D | 2.5000 | 1.6696 | 0.8973 |
| 1106-R | 5.6354 | 40.2800 | -7.6515 |
| 1113-D | 0.4854 | 0.3245 | 0.2159 |
| 1114-D | 2.2918 | 2.4526 | 2.5612 |
| 1114-R | 18.0680 | 5.5643 | 3.9420 |
| 1120-D | 0.2000 | 0.6624 | 1.6738 |
| 1121-D | 3.3086 | 2.4292 | 0.2000 |
| 1121-R | -8.6517 | 175.7947 | -4.7792 |
| 1122-D | 0.2000 | 0.6170 | 1.8348 |
| 1122-R | -8.1700 | -40.6328 | 4.4101 |

Figure 12:
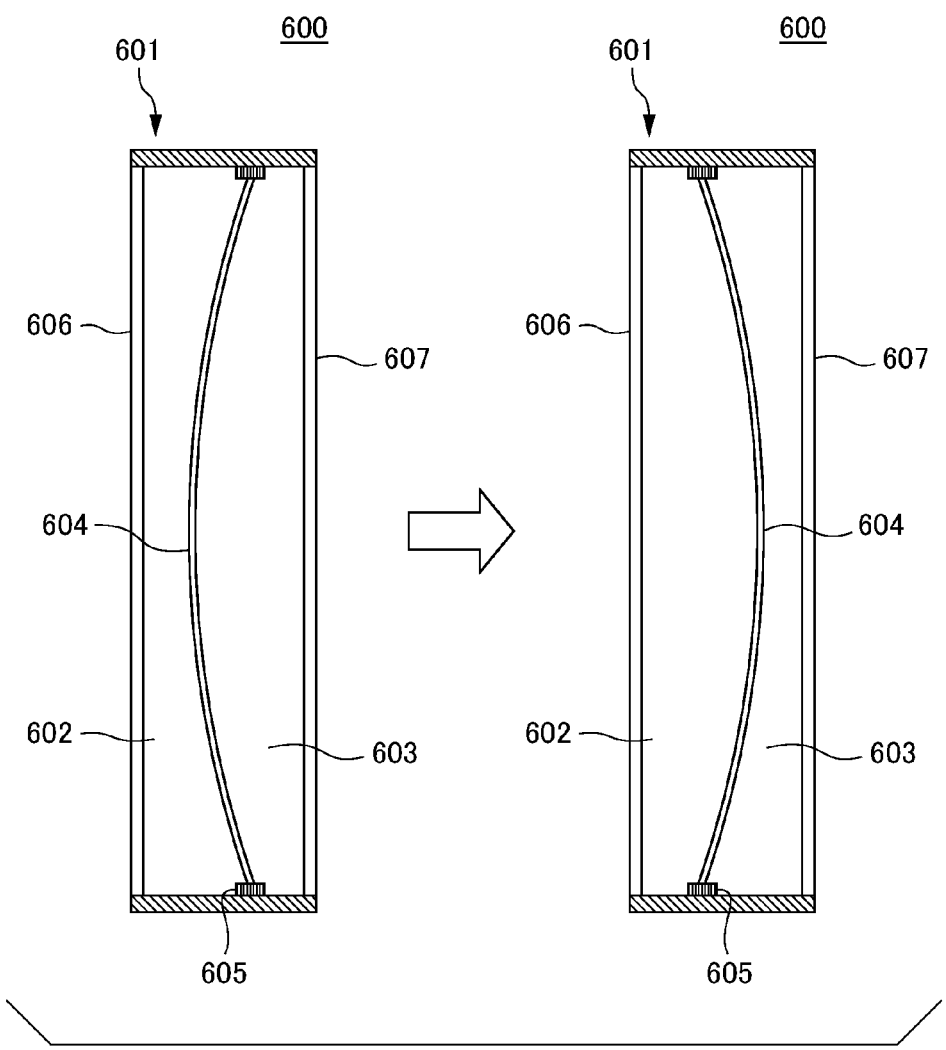
FIG. 12 is a schematic view illustrating the configuration of a variable focus lens according to another embodiment.

While the present embodiment has been described based on the assumption that two or three liquid lenses are employed for a zoom lens, the present invention is applicable even when a plurality of (i.e., two or more) liquid lenses is employed. A method for changing the shape of the interface of the liquid lens is not limited to the aforementioned electrowetting method. For example, another method in which an optically transparent thin film is installed at an interface and the end of the thin film is mechanically moved within the liquid lens to thereby change the shape of the interface is also included. FIG. 12 is a schematic view illustrating the configuration of a liquid lens in which a transparent elastic film is disposed as a liquid interface. As shown in FIG. 12, a liquid lens 600 has a generally cylindrical case 601. In the interior of the case 601, two types of liquid, a first liquid 602 and a second liquid 603, are arranged in two layers in the optical axis direction, and a transparent elastic film 604 is disposed at the interface formed between the liquid 602 and 603. As shown in FIG. 12, the liquid lens 600 moves the elastic film 604 by a thin film moving unit 605 disposed at the end thereof, whereby the shape of the interface formed by the elastic film 604 is changed while keeping the volume of the liquid 602 and 603 constant. Note that the configuration of cover glasses 606 and 607 is the same as that of the first liquid lens 101 according to the first embodiment. Although the structure of the liquid lens 600 has more complexity than that of the electrowetting-type liquid lens, an immiscible liquid material to be employed for an electrowetting-type liquid lens is not required to be selected, resulting in a great increase in the degree of freedom in selecting liquid.

Also, the shape (structure) of the electrodes for the liquid lens to be employed for the zoom lens of the present invention is not particularly limited. For example, as shown in FIG. 1A and FIG. 1B, the electrode portion of the first liquid lens 101 according to the first embodiment has a stepwise structure. This is because the radius of curvature of the second interface 205 is preferably changed by making the outer diameter of the rear electrode 207 smaller than that of the front electrode 206. Thus, the shape of the electrodes 206 and 207 may be changed depending on the characteristics of a desired zoom lens such that the outer diameter thereof has simply a cylindrical shape or a taper angle. Furthermore, in the liquid lenses 101 and 105 according to the first embodiment, both of which have a three-layer structure employing three types of liquid. However, for example, a liquid lens that changes a refractive power using a single interface formed by two types of liquid, or another liquid lens that employs a plurality of (four types or more) liquids may also be used.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162043 filed Jul. 16, 2010 which is hereby incorporated by reference herein in its entirety.

What is claimed is:

1. A zoom lens comprising:
a stop;
a variable focus lens disposed on a light incident side of the stop;
a first lens disposed between the variable focus lens and the stop,
wherein the first lens is a meniscus lens having a concave surface facing an image plane of the zoom lens,
wherein when a distance from a first surface to the image plane of the zoom lens is defined as $T_a$, and a distance from a variable refractive power surface closest to the stop of the variable focus lens to the stop is defined as $T_b$, the following condition is satisfied:

$$T_b/T_a < 0.22.$$

2. The zoom lens according to claim 1, further comprising a variable focus lens disposed on a light emission side of the stop.

3. The zoom lens according to claim 2, wherein, during zooming from a wide angle end to a telephoto end, the variable focus lens disposed on the light incident side of the stop changes from a negative refractive power to a positive refractive power, and the variable focus lens disposed on the light emission side of the stop changes from a positive refractive power to a negative refractive power.

4. The zoom lens according to claim 2, further comprising a second lens having a positive refractive power between the stop and the variable focus lens disposed on the light emission side of the stop.

5. A zoom lens comprising:
a stop;
a first variable focus lens disposed on a light incident side of the stop; and
a second variable focus lens disposed on a light emission side of the stop
wherein when a distance from a first surface to an image plane of the zoom lens is defined as $T_a$, and a distance from a variable refractive power surface closest to the stop of the first variable focus lens to the stop is defined as $T_b$, the following condition is satisfied:

$$T_b/T_a < 0.22,$$

wherein during zooming from a wide angle end to a telephoto end, the first variable focus lens changes from a negative refractive power to a positive refractive power, and the second variable focus lens changes from a positive refractive power to a negative refractive power.

* * * * *